(12) United States Patent
Machida et al.

(10) Patent No.: US 12,449,180 B2
(45) Date of Patent: Oct. 21, 2025

(54) COLD STORAGE MATERIAL AND COOLER BOX

(71) Applicant: Panasonic Holdings Corporation, Osaka (JP)

(72) Inventors: Hironobu Machida, Nara (JP); Motohiro Suzuki, Osaka (JP); Shinsuke Takeguchi, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 76 days.

(21) Appl. No.: 18/294,986

(22) PCT Filed: Aug. 5, 2021

(86) PCT No.: PCT/JP2021/029208
§ 371 (c)(1),
(2) Date: Feb. 2, 2024

(87) PCT Pub. No.: WO2023/012992
PCT Pub. Date: Feb. 9, 2023

(65) Prior Publication Data
US 2024/0337428 A1 Oct. 10, 2024

(51) Int. Cl.
*F25D 3/00* (2006.01)
(52) U.S. Cl.
CPC .......... *F25D 3/00* (2013.01); *F25D 2303/085* (2013.01); *F25D 2331/804* (2013.01)
(58) Field of Classification Search
CPC ................. F25D 3/00; F25D 2303/085; F25D 2331/804; C09K 5/066; Y02E 60/14
See application file for complete search history.

(56) References Cited

U.S. PATENT DOCUMENTS

2020/0095489 A1 3/2020 Tang et al.
2020/0102485 A1* 4/2020 Machida et al. ......... C09K 5/06

FOREIGN PATENT DOCUMENTS

JP 2018-059676 A 4/2018
JP 6590127 B1 10/2019
JP 7388941 B2 11/2023

OTHER PUBLICATIONS

International Search Report issued in corresponding International Patent Application No. PCT/JP2021/029208, dated Sep. 7, 2021 w/English Translation.

* cited by examiner

*Primary Examiner* — Jerry-Daryl Fletcher
*Assistant Examiner* — Dario Antonio Deleon
(74) *Attorney, Agent, or Firm* — Rimon P.C.

(57) ABSTRACT

A cold storage material of the present disclosure includes: tetrahydrofuran; water; and at least one silver compound selected from the group consisting of silver phosphate represented by a chemical formula $Ag_3PO_4$, silver carbonate represented by a chemical formula $Ag_2CO_3$, and a silver oxide represented by a chemical formula AgO. This cold storage material has a melting point of 2 degrees Celsius or higher and 8 degrees Celsius or lower and a crystallization temperature of 0 degrees Celsius or higher and lower than the melting point.

8 Claims, 3 Drawing Sheets

COLD STORAGE MATERIAL AND COOLER BOX

CROSS-REFERENCE TO RELATED APPLICATIONS

This application is the U.S. National Phase under 35 U.S.C. § 371 of International Application No. PCT/JP2021/029208, filed on Sep. 5, 2021, the entire contents of which are hereby incorporated by reference.

TECHNICAL FIELD

The present invention relates to a cold storage material and a cooler box.

BACKGROUND ART

Patent Literature 1 discloses a cold storage material capable of turning into a clathrate hydrate by cooling. A cold storage material according to Sample C-6 disclosed in Patent Literature 1 is composed of 0.05 mmol of AgI and a 19 weight % aqueous solution of tetrahydrofuran. The cold storage material according to Sample C-6 has a melting point of 4.6 degrees Celsius and a crystallization temperature of minus 7 degrees Celsius.

CITATION LIST

Patent Literature

Patent Literature 1: JP 2018-059676 A

SUMMARY OF INVENTION

Technical Problem

The present disclosure aims to provide a cold storage material suitable for preservation and refrigeration of medicine or food.

Solution to Problem

The cold storage material according to the present disclosure includes:
tetrahydrofuran;
water; and
at least one silver compound selected from the group consisting of silver phosphate represented by a chemical formula $Ag_3PO_4$, silver carbonate represented by a chemical formula $Ag_2CO_3$, and a silver oxide represented by a chemical formula AgO, wherein
the cold storage material has a melting point of 2 degrees Celsius or higher and 8 degrees Celsius or lower, and
the cold storage material has a crystallization temperature of 0 degrees Celsius or higher and lower than the melting point.

Advantageous Effects of Invention

The present disclosure provides a cold storage material suitable for preservation and refrigeration of medicine or food.

DESCRIPTION OF EMBODIMENTS

Embodiments of the present disclosure will be described hereinafter with reference to the drawings. The present disclosure is not limited to embodiments below.

First Embodiment

Figure 1:
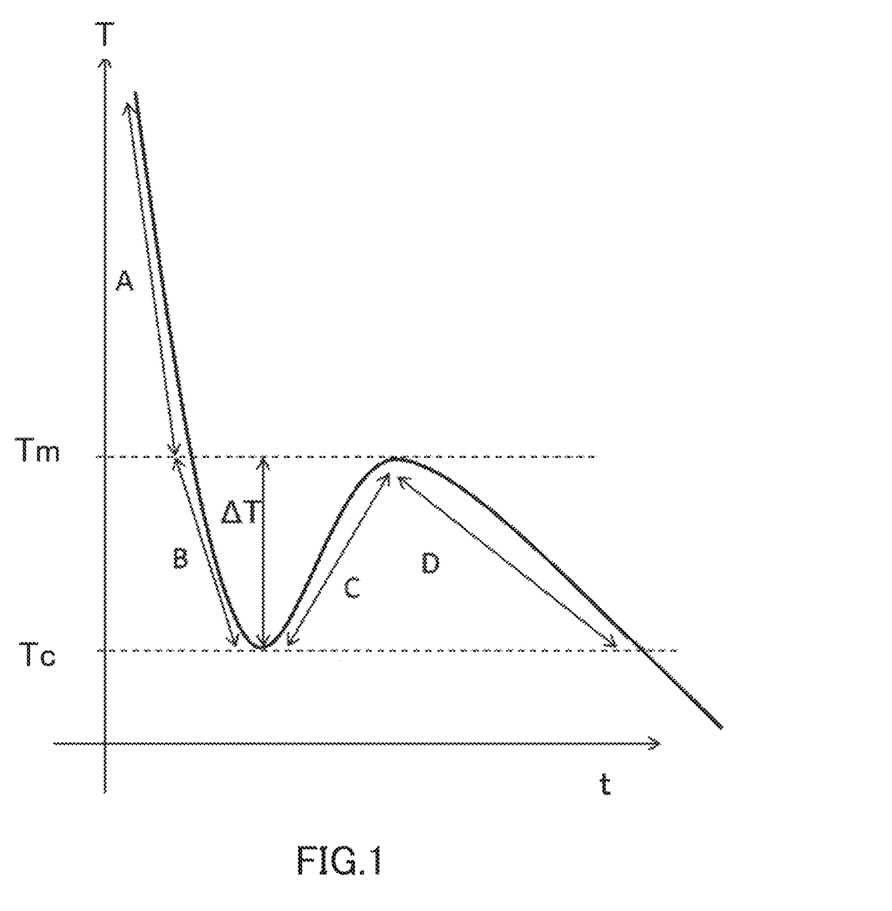
FIG. 1 is a graph showing properties of a cold storage material according to a first embodiment during cold storage.

FIG. 1 is a graph showing properties of a cold storage material according to a first embodiment during cooling. In FIG. 1, the horizontal axis and the vertical axis respectively represent time t and temperature T.

The cold storage material according to the first embodiment is cooled. Refer to a zone A shown in FIG. 1. Unlike common liquids, as is well known in the technical field of cold storage materials, the cold storage material does not solidify and becomes a supercooling state even when the temperature of the cold storage material reaches its melting point Tm by cooling. Refer to a zone B shown in FIG. 1. The cold storage material is liquid in the supercooling state.

Then, the cold storage material starts crystallizing spontaneously. In the course of the crystallization, the cold storage material discharges crystallization heat being an approximate equivalent to latent heat. Consequently, the temperature of the cold storage material starts rising. Refer to a zone C shown in FIG. 1. In the present specification, a temperature at which a cold storage material starts crystallizing spontaneously is called "crystallization temperature Tc".

The symbol ΔT represents a difference between the melting point Tm and the crystallization temperature Tc of the cold storage material. The difference ΔT is also called "degree of supercooling". The crystallization of the cold storage material in the supercooling state turns the cold storage material into, for example, a clathrate hydrate (for example, refer to Patent Literature 1). A clathrate hydrate refers to a crystal including a cage-like crystal and a substance other than water, the cage-like crystal being made of hydrogen-bonded water molecules, the substance being surrounded by the cage-like crystal. A concentration at which water molecules and a guest molecule form a clathrate hydrate with no excess nor shortage of the molecules is called a congruent concentration. Generally, a clathrate hydrate is often used around the congruent concentration.

Upon simultaneous completion of the crystallization and the discharge of the crystallization heat of the cold storage material, the temperature of the cold storage material gradually decreases to be equal to an ambient temperature. Refer to a zone D shown in FIG. 1. In FIG. 1, the cold storage material is cooled to a temperature lower than the crystallization temperature Tc. However, the temperature of the cold storage material may be maintained in the temperature range between the melting point Tm and the crystallization temperature Tc.

The crystallization temperature Tc of the cold storage material is lower than the melting point Tm of the cold storage material. The melting point of the cold storage material can be measured using, as is well known in the technical field of cold storage materials, a differential scanning calorimeter. A differential scanning calorimeter can be called a "DSC".

Figure 2:
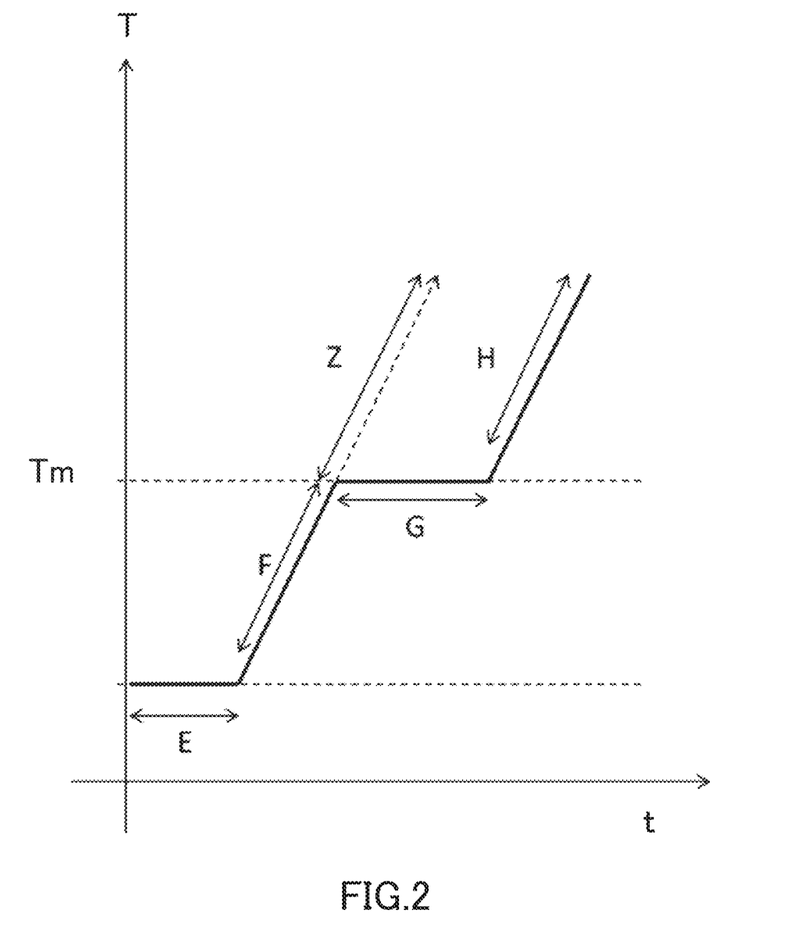
FIG. 2 is a graph showing properties of the cold storage material according to the first embodiment during cold releasing.

FIG. 2 is a graph showing the properties of the cold storage material of the first embodiment during warming. In FIG. 2, the horizontal axis and the vertical axis respectively represent time t and temperature T. During a zone E, the temperature of the cold storage material is maintained at a temperature equal to or lower than the melting point Tm of the cold storage material. For example, the temperature inside a cooler box is set at a temperature equal to or lower than the melting point Tm of the cold storage material so that the temperature of the cold storage material placed inside the cooler box can be maintained at a temperature equal to or lower than the melting point Tm of the cold storage material while a lid of the cooler box is closed. In the zone E, the temperature of the cold storage material may be maintained at a temperature equal to or lower than its crystallization temperature Tc.

Subsequently, the cold storage material is gradually warmed. Refer to a zone F shown in FIG. 2. For example, at the end of the zone E, namely, at the beginning of the zone F, the temperature inside the cooler box gradually rises by opening the lid of the cooler box or by opening the lid and putting food inside.

Reaching the melting point Tm of the cold storage material, the temperature of the cold storage material is maintained around the melting point Tm of the cold storage material. Refer to a zone G shown in FIG. 2. Without the cold storage material, the temperature inside the cooler box would continuously rise as shown in a zone Z in FIG. 2. On the other hand, with the cold storage material, the temperature inside the cooler box is maintained around the melting point of the cold storage material during a certain period of time, namely, the zone G. In this manner, the inside of the cooler box is kept cold by the cold energy stored in the cold storage material. At the end of the zone G, the crystal of the cold storage material melts and disappears. The cold storage material consequently liquefies.

After that, the temperature of the liquefied cold storage material rises to be equal to the ambient temperature. Refer to a zone H shown in FIG. 2.

The cold storage material can be cooled and reused.

It is important for a cold storage material configured to be suitable for cooler boxes capable of containing medicine or food to satisfy the following requirements (I) and (II).

Requirement (I) The cold storage material has a melting point of 2 degrees Celsius or higher and 8 degrees Celsius or lower. In one example, the cold storage material has a melting point of 3.0 degrees Celsius or higher and 7 degrees Celsius or lower.

Requirement (II) The cold storage material has a crystallization temperature Tc of 0 degrees Celsius or higher and lower than the melting point Tm. In one example, the cold storage material has a crystallization temperature Tc of 0 degrees Celsius or higher and lower than 3.0 degrees Celsius (e.g., 2.5 degrees Celsius or lower).

For preservation of medicine and food, the requirement (I) needs to be satisfied because the internal temperature of a cooler box should be maintained at about 2 degrees Celsius or higher and about 8 degrees Celsius or lower. If the internal temperature of a cooler box is maintained at a temperature lower than 0 degrees Celsius, water contained in medicine and food turns into ice, and therefore the medicine and the food can deteriorate. On the other hand, if the internal temperature of a cooler box is maintained at a temperature higher than 8 degrees Celsius, the cooler box does not function substantially.

A cold storage material satisfying the requirement (II) can have a higher efficiency in a zone where the cold storage material is cooled for the function as a cold storage material, namely, the zone B in FIG. 1. This efficiency is hereinafter called "crystallization efficiency". The crystallization efficiency decreases as the crystallization temperature Tc decreases. As is obvious from FIG. 1, particularly, from the zone B of FIG. 1, for example, in the case that a cold storage material having a crystallization temperature of minus 18 degrees Celsius is cooled for the function as a cold storage material, the cold storage material needs to be cooled in a freezer maintained at a temperature lower than minus 18 degrees Celsius, e.g., at minus 20 degrees Celsius. A cold storage material having a crystallization temperature Tc of minus 18 degrees Celsius is hereinafter called "minus 18 cold storage material". Meanwhile, for example, in the case that a cold storage material having a crystallization temperature Tc of minus 1 degrees Celsius is cooled for the function as a cold storage material, the cold storage material is cooled in a freezer maintained at a temperature lower than minus 1 degrees Celsius. A cold storage material having a crystallization temperature Tc of minus 1 degrees Celsius is hereinafter called "minus 1 cold storage material". The energy required to cool a minus 1 cold storage material is smaller than the energy required to cool a minus 18 cold storage material. That is, the higher the crystallization temperature Tc is, the better the crystallization efficiency is.

In this technical field, heat of fusion is also referred to as latent heat.

In order to avoid confusion, in the present specification, "kelvin" is used for the degree of supercooling $\Delta T$. The present inventors write, for example, as follows: "the degree of supercooling $\Delta T$ is n kelvins or lower". Needless to say, n represents a real number. The description "the degree of supercooling $\Delta T \leq 5$ kelvins" means that a difference between the melting point Tm and the crystallization temperature Tc of a cold storage material is 5 kelvins or lower. On the other hand, in the present specification, "degree Celsius" is used for description of temperature. The present inventors write, for example, as follows: "the crystallization temperature Tc is 5 degrees Celsius". Five degrees Celsius can be expressed as 5° C.

The cold storage material according to the first embodiment includes:
  tetrahydrofuran;
  water; and
  at least one silver compound selected from the group consisting of silver phosphate represented by a chemical formula $Ag_3PO_4$, silver carbonate represented by a chemical formula $Ag_2CO_3$, and a silver oxide represented by a chemical formula AgO.

As demonstrated by later-described Examples, the cold storage material according to the first embodiment has a melting point Tm of 2 degrees Celsius or higher and 8 degrees Celsius or lower. Because of this, the cold storage material according to the first embodiment is suitably used for preservation of medicine and food.

As demonstrated by later-described Examples, the cold storage material according to the first embodiment has a crystallization temperature Tc of 0 degrees Celsius or higher. On the other hand, as described in BACKGROUND ART, the cold storage material according to Sample C-6 of Patent Literature 1 has a crystallization temperature Tc of minus 7 degrees Celsius. That is, the crystallization efficiency of the cold storage material according to the first embodiment is higher than that of the cold storage material described in Patent Literature 1. In other words, the energy required in the zone B to cool the cold storage material according to the first embodiment is smaller than that required to cool the cold storage material according to Sample C-6 of Patent Literature 1.

As is obvious from FIG. 1, the crystallization temperature Tc of the cold storage material is lower than the melting point Tm of the cold storage material. The degree of supercooling ΔT of the cold storage material may be, for example, higher than 0 and 8 kelvins or lower, or 1 kelvin or higher and 5 kelvins or lower.

The cold storage material according to the first embodiment includes at least one silver compound selected from the group consisting of silver phosphate represented by a chemical formula $Ag_3PO_4$, silver carbonate represented by a chemical formula $Ag_2CO_3$, and a silver oxide represented by a chemical formula AgO. As demonstrated by later-described Comparative Examples, for example, in the case of using another silver compound such as silver iodide, silver bromide, or silver chloride instead of the above three silver compounds, the crystallization temperature Tc is lower. Likewise, as demonstrated by later-described Comparative Examples, in the case of using another metal salt such as titanium oxide, vanadium oxide, iron oxide, nickel oxide, manganese oxide, or zinc oxide instead of the above three silver compounds, the crystallization temperature Tc is lower.

As long as the cold storage material according to the first embodiment has a melting point Tm of 2 degrees Celsius or higher and 8 degrees Celsius or lower and a crystallization temperature Tc of 0 degrees Celsius or higher and lower than the melting point Tm, a molar ratio of the tetrahydrofuran to the water is not limited to a particular value in the cold storage material of the first embodiment. In one example, the molar ratio is 0.05 or more and 0.07 or less. It is known that when a cold storage material in which the molar ratio of tetrahydrofuran to water is 1/17 is cooled, the water and the tetrahydrofuran form a clathrate hydrate crystal with no excess nor shortage of the water and the tetrahydrofuran. When the molar ratio of the tetrahydrofuran to the water is 0.05 or more and 0.07 or less, the molar ratio is nearly 1/17, and the cold storage material tends to have a large latent heat.

As demonstrated by Example 1A to Example 3D, a molar ratio of the silver compound to the water is not limited to a particular value in the cold storage material of the first embodiment. In one example, the molar ratio is $2.64 \times 10^{-8}$ or more and $3.70 \times 10^{-4}$ or less.

The cold storage material according to the first embodiment may include an additive other than the tetrahydrofuran, the water, and the above silver compound as long as the cold storage material according to the first embodiment has a melting point Tm of 2 degrees Celsius or higher and 8 degrees Celsius or lower and a crystallization temperature Tc of 0 degrees Celsius or higher and lower than the melting point Tm.

The amount of the additive is not limited to a particular value. A ratio of the amount of the additive to the sum of the amount of the tetrahydrofuran, the amount of the water, and the amount of the above silver compound is, for example, 0.1 or less on a mass basis, and may be 0.05 or less, or 0.01 or less on a mass basis. Examples of the additive include a supercooling inhibitor, a thickener, and an antiseptic agent.

The cold storage material according to the first embodiment may be free of the additive. In other words, except for inevitably introduced impurities, the cold storage material according to the first embodiment may consist of the tetrahydrofuran, the water, and the silver compound.

The cold storage material according to the first embodiment can be manufactured, for example, by mixing the tetrahydrofuran, the water, and the silver compound.

Second Embodiment

Hereinafter, a cooler box according to a second embodiment will be described.

Figure 3:
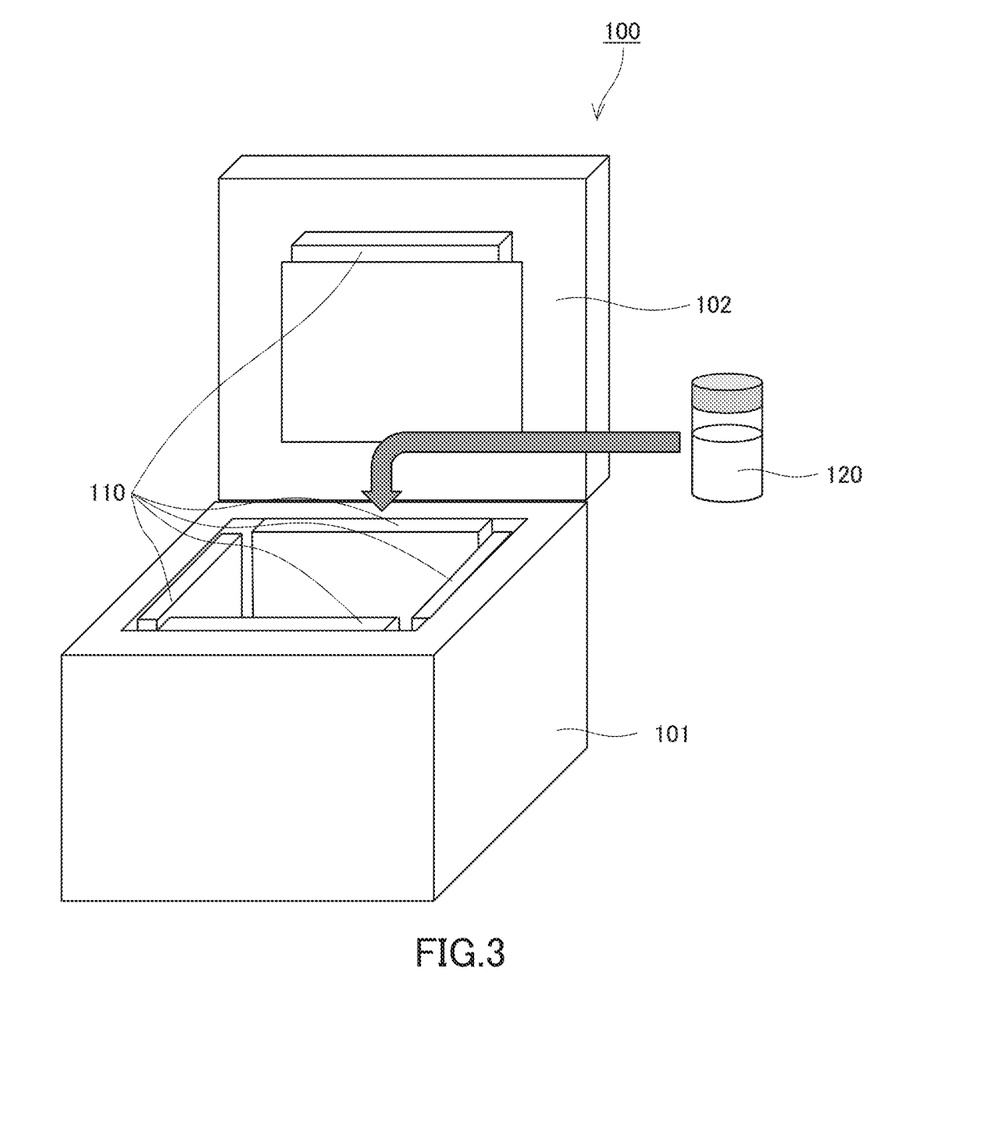
FIG. 3 is a schematic diagram of a cooler box according to a second embodiment.

FIG. 3 shows a schematic diagram of the cooler box 100 according to the second embodiment.

The cooler box 100 includes: a thermal insulation box 101 having a bottom (not illustrated) and a side portion; and a thermal insulation lid 102.

The cold storage material according to the first embodiment is provided along at least one selected from the group consisting of an inner bottom face of the thermal insulation box 101, an inner side face of the thermal insulation box 101, and an inner face of the thermal insulation lid 102, namely, an undersurface of the thermal insulation lid 102. In FIG. 3, a cold storage material pack 110 packed with the cold storage material according to the first embodiment is provided in contact with each of four inner side faces of the thermal insulation box 101 having a rectangular parallelepiped shape.

The cold storage material according to the first embodiment may be provided inside of at least one selected from the group consisting of the bottom of the thermal insulation box 101, the side portion of the thermal insulation box 101, and the thermal insulation lid 102. The cold storage material according to the first embodiment may be placed in an interior space of the cooler box 100, packed in the cold storage material pack 110. The interior space of the cooler box 100 is a space defined by the inner bottom face of the thermal insulation box 101, the inner side face of the thermal insulation box 101, and the inner face of the thermal insulation lid 102.

The cold storage material according to the first embodiment may be provided inside at least one selected from the group consisting of the side portion of the thermal insulation box 101, the thermal insulation lid 102 of the thermal insulation box 101, and the thermal insulation box 101 as a whole. In this case as well, the cold storage material according to the first embodiment provided may be packed in the cold storage material pack 110.

It is desirable that at least one selected from the group consisting of medicine and food be put into the thermal insulation box 101. According to FIG. 3, a medicine 120 is put into the thermal insulation box 101. Examples of the medicine include liquid medicines. Examples of the liquid medicines include vaccines. When a vaccine is carried, the vaccine is required to be preserved, for example, at 2 degrees Celsius or higher and 8 degrees Celsius or lower to maintain the quality thereof. The medicine may be a solid medicine or a gel medicine. Since the cold storage material according to the first embodiment has a melting point of 2 degrees Celsius or higher and 8 degrees Celsius or lower, the cooler box according to the second embodiment is suitable for carrying vaccines.

EXAMPLES

The present disclosure will be described in more details with reference to examples below.

Silver phosphate is represented by a chemical formula $Ag_3PO_4$ in EXAMPLES. The silver phosphate used in the examples was purchased from Mitsuwa Chemicals Co., Ltd. Silver carbonate is represented by a chemical formula Ag$_2$CO$_3$ in EXAMPLES. The silver carbonate used in the examples was purchased from FUJIFILM Wako Pure Chemical Corporation. Silver oxide is represented by a chemical formula AgO in EXAMPLES. In other words, in the present specification, silver oxide is not silver (I) oxide represented by a chemical formula Ag$_2$O but silver (II) oxide. The silver oxide used in the examples was purchased from FUJIFILM Wako Pure Chemical Corporation. Tetrahydrofuran is abbreviated as "THF" in EXAMPLES. The THF used in the examples was purchased from Tokyo Chemical Industry Co., Ltd.

Example 1A

Method for Producing Cold Storage Material

First, the reagents shown in Table 1 below were added into a 60-milliliter screw tube to obtain a mixture. The mixture was sufficiently stirred inside the screw tube to obtain a cold storage material according to Example 1A. The screw tube was a glass tube to which a lid with a screw is attachable with the screw.

TABLE 1

| Reagent | Amount |
| --- | --- |
| Silver phosphate | 0.0419 g (equivalent to 1 × 10$^{-4}$ mol) |
| THF | 1.144 g (equivalent to approx. 0.0159 mol) |
| Pure water | 4.856 g (equivalent to approx. 0.270 mol) |

Measurement of Melting Point and Crystallization Temperature

A screw tube containing approximately 6 g of the cold storage material according to Example 1A was put in a constant-temperature chamber SU-241 manufactured by ESPEC Corporation. A thermocouple was attached to the screw tube, and the internal temperature of the screw tube was measured. The temperature in the constant-temperature chamber was maintained at 20 degrees Celsius for two hours. Then, the temperature in the constant-temperature chamber was decreased at a rate of 1 degree Celsius per minute. After reaching 4 degrees Celsius, the temperature in the constant-temperature chamber was maintained at 4 degrees Celsius for 30 minutes.

After that, the temperature in the constant-temperature chamber was decreased from 4 degrees Celsius to minus 20 degrees Celsius at a rate of 1 degree Celsius per 24 hours. The temperature of the cold storage material according to Example 1A in the constant-temperature chamber was recorded using the thermocouple and a data logger NR-600 manufactured by Keyence Corporation. The crystallization temperature of the cold storage material according to Example 1A was calculated from the temperature of the cold storage material at the beginning of a rapid rise of the temperature of the cold storage material (refer to the zone C in FIG. 1) and the melting point thereof (described in the next paragraph).

The cold storage material according to Example 1A in the constant-temperature chamber was maintained at minus 20 degrees Celsius for three hours. After that, the temperature in the constant-temperature chamber was increased at a rate of 1 degree Celsius per minute. The melting point of the cold storage material according to Example 1A was measured using a differential scanning calorimeter (DSC). The measurement revealed that the cold storage material according to Example 1A had a melting point of 4.5 degrees Celsius.

Example 1B

An experiment that is the same as that in Example 1A except for the following points was performed in Example 1B. The reagents shown in Table 2 below were used instead of the reagents shown in Table 1. Additionally, a 110-milliliter screw tube was used instead of a 60-milliliter screw tube. Table 27 shows the experiment results.

TABLE 2

| Reagent | Amount |
| --- | --- |
| Silver phosphate | 0.010 g (equivalent to 2.39 × 10$^{-5}$ mol) |
| THF | 19.071 g (equivalent to approx. 0.264 mol) |
| Pure water | 80.929 g (equivalent to approx. 4.50 mol) |

Example 1B

An experiment that is the same as that in Example 1A except for the following points was performed in Example 1C. The reagents shown in Table 3 below were used instead of the reagents shown in Table 1. Additionally, a 110-milliliter screw tube was used instead of a 60-milliliter screw tube. Table 27 shows the experiment results.

TABLE 3

| Reagent | Amount |
| --- | --- |
| Silver phosphate | 0.001 g (equivalent to 2.39 × 10$^{-6}$ mol) |
| THF | 19.071 g (equivalent to approx. 0.264 mol) |
| Pure water | 80.929 g (equivalent to approx. 4.50 mol) |

Example 1D

An experiment that is the same as that in Example 1A except for the following points was performed in Example 1D. Instead of the reagents shown in Table 1, the cold storage material and the reagents shown in Table 4 below were mixed. Additionally, a 110-milliliter screw tube was used instead of a 60-milliliter screw tube. Table 27 shows the experiment results.

TABLE 4

| Reagent | Amount |
| --- | --- |
| Cold storage material according to Example 1C | 5.00 g |
| THF | 18.117 g (equivalent to approx. 0.251 mol) |
| Pure water | 76.883 g (equivalent to approx. 4.27 mol) |

Example 2A

An experiment that is the same as that in Example 1A except that the reagents shown in Table 5 below were used instead of the reagents shown in Table 1 was performed in Example 2A. Table 27 shows the experiment results.

TABLE 5

| Reagent | Amount |
| --- | --- |
| Silver carbonate | 0.0276 g (equivalent to $1.00 \times 10^{-4}$ mol) |
| THF | 1.144 g (equivalent to approx. 0.0159 mol) |
| Pure water | 4.856 g (equivalent to approx. 0.270 mol) |

Example 2B

An experiment that is the same as that in Example 1A except for the following points was performed in Example 2B. The reagents shown in Table 6 below were used instead of the reagents shown in Table 1. Additionally, a 110-milliliter screw tube was used instead of a 60-milliliter screw tube. Table 27 shows the experiment results.

TABLE 6

| Reagent | Amount |
| --- | --- |
| Silver carbonate | 0.01 g (equivalent to $3.63 \times 10^{-5}$ mol) |
| THF | 19.071 g (equivalent to approx. 0.264 mol) |
| Pure water | 80.929 g (equivalent to approx. 4.50 mol) |

Example 2C

An experiment that is the same as that in Example 1A except for the following points was performed in Example 2C. The reagents shown in Table 7 below were used instead of the reagents shown in Table 1. Additionally, a 110-milliliter screw tube was used instead of a 60-milliliter screw tube. Table 27 shows the experiment results.

TABLE 7

| Reagent | Amount |
| --- | --- |
| Silver carbonate | 0.001 g (equivalent to $3.63 \times 10^{-6}$ mol) |
| THF | 19.071 g (equivalent to approx. 0.264 mol) |
| Pure water | 80.929 g (equivalent to approx. 4.50 mol) |

Example 2D

An experiment that is the same as that in Example 1A except for the following points was performed in Example 2D. Instead of the reagents shown in Table 1, the cold storage material and the reagents shown in Table 8 below were mixed. Additionally, a 110-milliliter screw tube was used instead of a 60-milliliter screw tube. Table 27 shows the experiment results.

TABLE 8

| Reagent | Amount |
| --- | --- |
| Cold storage material according to Example 2C | 20.00 g |
| THF | 15.257 g (equivalent to approx. 0.212 mol) |
| Pure water | 64.743 g (equivalent to approx. 3.60 mol) |

Example 3A

An experiment that is the same as that in Example 1A except that the reagents shown in Table 9 below were used instead of the reagents shown in Table 1 was performed in Example 3A. Table 27 shows the experiment results.

TABLE 9

| Reagent | Amount |
| --- | --- |
| Silver oxide | 0.0124 g (equivalent to $1.00 \times 10^{-4}$ mol) |
| THF | 1.144 g (equivalent to approx. 0.0159 mol) |
| Pure water | 4.856 g (equivalent to approx. 0.270 mol) |

Example 3B

An experiment that is the same as that in Example 1A except for the following points was performed in Example 3B. The reagents shown in Table 10 below were used instead of the reagents shown in Table 1. Additionally, a 110-milliliter screw tube was used instead of a 60-milliliter screw tube. Table 27 shows the experiment results.

TABLE 10

| Reagent | Amount |
| --- | --- |
| Silver oxide | 0.01 g (equivalent to $8.07 \times 10^{-5}$ mol) |
| THF | 19.071 g (equivalent to approx. 0.264 mol) |
| Pure water | 80.929 g (equivalent to approx. 4.50 mol) |

Example 3C

An experiment that is the same as that in Example 1A except for the following points was performed in Example 3C. The reagents shown in Table 11 below were used instead of the reagents shown in Table 1. A 110-milliliter screw tube was used instead of a 60-milliliter screw tube. Table 27 shows the experiment results.

TABLE 11

| Reagent | Amount |
| --- | --- |
| Silver oxide | 0.001 g (equivalent to $8.07 \times 10^{-6}$ mol) |
| THF | 19.071 g (equivalent to approx. 0.264 mol) |
| Pure water | 80.929 g (equivalent to approx. 4.50 mol) |

Example 3D

An experiment that is the same as that in Example 1A except for the following points was performed in Example 3D. Instead of the reagents shown in Table 1, the reagents and the cold storage material shown in Table 12 below were mixed. Additionally, a 110-milliliter screw tube was used instead of a 60-milliliter screw tube. Table 27 shows the experiment results.

TABLE 12

| Reagent | Amount |
| --- | --- |
| Cold storage material according to Example 3C | 20.0 g |
| THF | 15.257 g (equivalent to approx. 0.212 mol) |
| Pure water | 64.743 g (equivalent to approx. 3.60 mol) |

Reference Example 1A

An experiment that is the same as that in Example 1A except that the reagents shown in Table 13 below were mixed instead of the reagents shown in Table 1 was performed in Reference Example 1A. Table 27 shows the experiment results.

TABLE 13

| Reagent | Amount |
| --- | --- |
| Silver fluoride | 0.0127 g (equivalent to $1.00 \times 10^{-4}$ mol) |
| THF | 1.144 g (equivalent to approx. 0.0159 mol) |
| Pure water | 4.856 g (equivalent to approx. 0.270 mol) |

Reference Example 1B

An experiment that is the same as that in Example 1A except for the following points was performed in Reference Example 1B. The reagents shown in Table 14 below were used instead of the reagents shown in Table 1. Additionally, a 110-milliliter screw tube was used instead of a 60-milliliter screw tube. Table 27 shows the experiment results.

TABLE 14

| Reagent | Amount |
| --- | --- |
| Silver fluoride | 0.01 g (equivalent to $7.88 \times 10^{-5}$ mol) |
| THF | 19.071 g (equivalent to approx. 0.264 mol) |
| Pure water | 80.929 g (equivalent to approx. 4.50 mol) |

Reference Example 1C

An experiment that is the same as that in Example 1A except for the following points was performed in Reference Example 1C. The reagents shown in Table 15 below were used instead of the reagents shown in Table 1. Additionally, a 110-milliliter screw tube was used instead of a 60-milliliter screw tube. Table 27 shows the experiment results.

TABLE 15

| Reagent | Amount |
| --- | --- |
| Silver fluoride | 0.001 g (equivalent to $7.88 \times 10^{-6}$ mol) |
| THF | 19.071 g (equivalent to approx. 0.264 mol) |
| Pure water | 80.929 g (equivalent to approx. 4.50 mol) |

Reference Example 1D

An experiment that is the same as that in Example 1A except for the following points was performed in Reference Example 1D. Instead of the reagents shown in Table 1, the reagents and the cold storage material shown in Table 16 below were mixed. Additionally, a 110-milliliter screw tube was used instead of a 60-milliliter screw tube. Table 27 shows the experiment results.

TABLE 16

| Reagent | Amount |
| --- | --- |
| Cold storage material according to Reference Example 1C | 50.0 g |
| THF | 9.535 g (equivalent to approx. 0.132 mol) |
| Pure water | 40.465 g (equivalent to approx. 2.25 mol) |

Reference Example 2

An experiment that is the same as that in Example 1A except that the reagents shown in Table 17 below were mixed instead of the reagents shown in Table 1 was performed in Reference Example 2. Table 27 shows the experiment results. Note that heavy water was used in Reference Example 2.

TABLE 17

| Reagent | Amount |
| --- | --- |
| Silver phosphate | 0.0419 g (equivalent to $1 \times 10^{-4}$ mol) |
| THF | 1.144 g (equivalent to approx. 0.0159 mol) |
| Heavy water | 5.407 g (equivalent to approx. 0.270 mol) |

Comparative Example 1

An experiment that is the same as that in Example 1A except that the reagents shown in Table 18 below were mixed instead of the reagents shown in Table 1 was performed in Comparative Example 1. The silver iodide was purchased from FUJIFILM Wako Pure Chemical Corporation. Table 27 shows the experiment results.

TABLE 18

| Reagent | Amount |
| --- | --- |
| Silver iodide | 0.0235 g (equivalent to $0.1 \times 10^{-3}$ mol) |
| THF | 1.144 g (equivalent to approx. 0.0159 mol) |
| Pure water | 4.856 g (equivalent to approx. 0.270 mol) |

Comparative Example 2

An experiment that is the same as that in Example 1A except that the reagents shown in Table 19 below were mixed instead of the reagents shown in Table 1 was performed in Comparative Example 2. The silver bromide was purchased from FUJIFILM Wako Pure Chemical Corporation. Table 27 shows the experiment results.

TABLE 19

| Reagent | Amount |
| --- | --- |
| Silver bromide | 0.0188 g (equivalent to $0.1 \times 10^{-4}$ mol) |
| THF | 1.144 g (equivalent to approx. 0.0159 mol) |
| Pure water | 4.856 g (equivalent to approx. 0.270 mol) |

Comparative Example 3

An experiment that is the same as that in Example 1A except that the reagents shown in Table 20 below were mixed instead of the reagents shown in Table 1 was performed in Comparative Example 3. The silver chloride was purchased from FUJIFILM Wako Pure Chemical Corporation. Table 27 shows the experiment results.

TABLE 20

| Reagent | Amount |
| --- | --- |
| Silver chloride | 0.0143 g (equivalent to $0.1 \times 10^{-4}$ mol) |
| THF | 1.144 g (equivalent to approx. 0.0159 mol) |
| Pure water | 4.856 g (equivalent to approx. 0.270 mol) |

Comparative Example 4

An experiment that is the same as that in Example 1A except that the reagents shown in Table 21 below were mixed instead of the reagents shown in Table 1 was performed in Comparative Example 4. The titanium oxide was purchased from FUJIFILM Wako Pure Chemical Corporation. Table 27 shows the experiment results.

TABLE 21

| Reagent | Amount |
|---|---|
| Titanium oxide | 0.008 g (equivalent to $0.1 \times 10^{-4}$ mol) |
| THF | 1.144 g (equivalent to approx. 0.0159 mol) |
| Pure water | 4.856 g (equivalent to approx. 0.270 mol) |

Comparative Example 5

An experiment that is the same as that in Example 1A except that the reagents shown in Table 22 below were mixed instead of the reagents shown in Table 1 was performed in Comparative Example 5. The vanadium oxide was purchased from FUJIFILM Wako Pure Chemical Corporation. Table 27 shows the experiment results.

TABLE 22

| Reagent | Amount |
|---|---|
| Vanadium oxide | 0.0182 g (equivalent to $0.1 \times 10^{-4}$ mol) |
| THF | 1.144 g (equivalent to approx. 0.0159 mol) |
| Pure water | 4.856 g (equivalent to approx. 0.270 mol) |

Comparative Example 6

An experiment that is the same as that in Example 1A except that the reagents shown in Table 23 below were mixed instead of the reagents shown in Table 1 was performed in Comparative Example 6. The iron oxide was purchased from FUJIFILM Wako Pure Chemical Corporation. Table 27 shows the experiment results.

TABLE 23

| Reagent | Amount |
|---|---|
| Iron oxide | 0.0160 g (equivalent to $0.1 \times 10^{-4}$ mol) |
| THF | 1.144 g (equivalent to approx. 0.0159 mol) |
| Pure water | 4.856 g (equivalent to approx. 0.270 mol) |

Comparative Example 7

An experiment that is the same as that in Example 1A except that the reagents shown in Table 24 below were mixed instead of the reagents shown in Table 1 was performed in Comparative Example 7. The nickel oxide was purchased from FUJIFILM Wako Pure Chemical Corporation. Table 27 shows the experiment results.

TABLE 24

| Reagent | Amount |
|---|---|
| Nickel oxide | 0.0074 g (equivalent to $0.1 \times 10^{-4}$ mol) |
| THF | 1.144 g (equivalent to approx. 0.0159 mol) |
| Pure water | 4.856 g (equivalent to approx. 0.270 mol) |

Comparative Example 8

An experiment that is the same as that in Example 1A except that the reagents shown in Table 25 below were mixed instead of the reagents shown in Table 1 was performed in Comparative Example 8. The manganese oxide was purchased from FUJIFILM Wako Pure Chemical Corporation. Table 27 shows the experiment results.

TABLE 25

| Reagent | Amount |
|---|---|
| Manganese oxide | 0.0071 g (equivalent to $0.1 \times 10^{-4}$ mol) |
| THF | 1.144 g (equivalent to approx. 0.0159 mol) |
| Pure water | 4.856 g (equivalent to approx. 0.270 mol) |

Comparative Example 9

An experiment that is the same as that in Example 1A except that the reagents shown in Table 26 below were mixed instead of the reagents shown in Table 1 was performed in Comparative Example 9. The zinc oxide was purchased from FUJIFILM Wako Pure Chemical Corporation. Table 27 shows the experiment results.

TABLE 26

| Reagent | Amount |
|---|---|
| Zinc oxide | 0.0081 g (equivalent to $0.1 \times 10^{-4}$ mol) |
| THF | 1.144 g (equivalent to approx. 0.0159 mol) |
| Pure water | 4.856 g (equivalent to approx. 0.270 mol) |

The cold storage materials according to Examples 1A, 2A, and 3A, Reference Examples 1A and 2, and Comparative Examples 1 to 9 each had a volume of approximately 6 milliliters. The cold storage materials according to Examples 1B to 1D, Examples 2B to 2D, Examples 3B to 3D, and Reference Examples 1B to 1D each had a volume of approximately 100 milliliters.

TABLE 27

| | Metal compound | Amount of substance of metal compound [mol] | Amount of substance of THF [mol] | Amount of substance of pure water or heavy water [mol] | Molar ratio of THF to water | Molar ratio of metal compound to water | Melting point Tm [° C.] | Crystallization temperature Tc [° C.] |
|---|---|---|---|---|---|---|---|---|
| Example 1A | Silver phosphate | $1 \times 10^{-4}$ | 0.0159 | 0.270 | 0.059 | $3.70 \times 10^{-4}$ | 4.5 | 2 |
| Example 1B | Silver phosphate | $2.39 \times 10^{-5}$ | 0.264 | 4.50 | 0.059 | $5.31 \times 10^{-6}$ | 4.5 | 2 |
| Example 1C | Silver phosphate | $2.39 \times 10^{-6}$ | 0.264 | 4.50 | 0.059 | $5.31 \times 10^{-7}$ | 4.5 | 2 |
| Example 1D | Silver | $1.19 \times 10^{-7}$ | 0.264 | 4.50 | 0.059 | $2.64 \times 10^{-8}$ | 4.5 | 2 |

TABLE 27-continued

| | Metal compound | Amount of substance of metal compound [mol] | Amount of substance of THF [mol] | Amount of substance of pure water or heavy water [mol] | Molar ratio of THF to water | Molar ratio of metal compound to water | Melting point Tm [° C.] | Crystallization temperature Tc [° C.] |
|---|---|---|---|---|---|---|---|---|
| Example 2A | Silver phosphate carbonate | $1 \times 10^{-4}$ | 0.0159 | 0.270 | 0.059 | $3.70 \times 10^{-4}$ | 4.5 | 1 |
| Example 2B | Silver carbonate | $3.63 \times 10^{-5}$ | 0.264 | 4.50 | 0.059 | $8.07 \times 10^{-6}$ | 4.5 | 1 |
| Example 2C | Silver carbonate | $3.63 \times 10^{-6}$ | 0.264 | 4.50 | 0.059 | $8.07 \times 10^{-7}$ | 4.5 | 1 |
| Example 2D | Silver carbonate | $7.25 \times 10^{-7}$ | 0.264 | 4.50 | 0.059 | $1.61 \times 10^{-7}$ | 4.5 | 1 |
| Example 3A | Silver oxide | $1 \times 10^{-4}$ | 0.0159 | 0.270 | 0.059 | $3.70 \times 10^{-4}$ | 4.5 | 2 |
| Example 3B | Silver oxide | $8.07 \times 10^{-5}$ | 0.264 | 4.50 | 0.059 | $1.79 \times 10^{-5}$ | 4.5 | 2 |
| Example 3C | Silver oxide | $8.07 \times 10^{-6}$ | 0.264 | 4.50 | 0.059 | $1.79 \times 10^{-6}$ | 4.5 | 2 |
| Example 3D | Silver oxide | $1.61 \times 10^{-6}$ | 0.264 | 4.50 | 0.059 | $3.58 \times 10^{-7}$ | 4.5 | 2 |
| Reference Example 1A | Silver fluoride | $1 \times 10^{-4}$ | 0.0159 | 0.270 | 0.059 | $3.70 \times 10^{-4}$ | 4.5 | 1 |
| Reference Example 1B | Silver fluoride | $7.88 \times 10^{-5}$ | 0.264 | 4.50 | 0.059 | $1.75 \times 10^{-5}$ | 4.5 | 1 |
| Reference Example 1C | Silver fluoride | $7.88 \times 10^{-6}$ | 0.264 | 4.50 | 0.059 | $1.75 \times 10^{-6}$ | 4.5 | 1 |
| Reference Example 1D | Silver fluoride | $3.94 \times 10^{-6}$ | 0.264 | 4.50 | 0.059 | $8.76 \times 10^{-7}$ | 4.5 | 1 |
| Reference Example 2 | Silver phosphate | $1 \times 10^{-4}$ | 0.0159 | 0.270 | 0.059 | $3.70 \times 10^{-4}$ | 8.0 | 5 |
| Comparative Example 1 | Silver iodide | $1 \times 10^{-4}$ | 0.0159 | 0.270 | 0.059 | $3.70 \times 10^{-4}$ | 4.5 | −7 |
| Comparative Example 2 | Silver bromide | $1 \times 10^{-4}$ | 0.0159 | 0.270 | 0.059 | $3.70 \times 10^{-4}$ | 4.5 | −15 |
| Comparative Example 3 | Silver chloride | $1 \times 10^{-4}$ | 0.0159 | 0.270 | 0.059 | $3.70 \times 10^{-4}$ | 4.5 | −15 |
| Comparative Example 4 | Titanium oxide | $1 \times 10^{-4}$ | 0.0159 | 0.270 | 0.059 | $3.70 \times 10^{-4}$ | 4.5 | −18 |
| Comparative Example 5 | Vanadium oxide | $1 \times 10^{-4}$ | 0.0159 | 0.270 | 0.059 | $3.70 \times 10^{-4}$ | 4.5 | −8 |
| Comparative Example 6 | Iron oxide | $1 \times 10^{-4}$ | 0.0159 | 0.270 | 0.059 | $3.70 \times 10^{-4}$ | 4.5 | −11 |
| Comparative Example 7 | Nickel oxide | $1 \times 10^{-4}$ | 0.0159 | 0.270 | 0.059 | $3.70 \times 10^{-4}$ | 4.5 | −13 |
| Comparative Example 8 | Manganese oxide | $1 \times 10^{-4}$ | 0.0159 | 0.270 | 0.059 | $3.70 \times 10^{-4}$ | 4.5 | −12 |
| Comparative Example 9 | Zinc oxide | $1 \times 10^{-4}$ | 0.0159 | 0.270 | 0.059 | $3.70 \times 10^{-4}$ | 4.5 | −18 |

As is obvious from Examples 1A to Example 3D, the cold storage material including THF, water, and at least one silver compound selected from the group consisting of silver phosphate, silver carbonate, and silver oxide has a melting point of 4.5 degrees Celsius and a crystallization temperature of 1 degree Celsius or higher and 2 degrees Celsius or lower.

Meanwhile, as is obvious from Comparative Examples 1 to 3, the cold storage material including THF, water, and a halogenated silver except silver fluoride has a melting point of 4.5 degrees Celsius but has a crystallization temperature of minus 7 degrees Celsius or lower.

As is obvious from Comparative Examples 4 to 9, the cold storage material including THF, water, and a metal oxide except silver oxide has a melting point of 4.5 degrees Celsius but has a crystallization temperature of minus 8 degrees Celsius or lower.

As described above, the cold storage materials according to Examples 1A to 3D have higher crystallization temperatures than those of the cold storage materials according to Comparative Examples 1 to 9; therefore, the cold storage materials according to Examples 1A to 3D have better crystallization efficiencies than those of the cold storage materials according to Comparative Examples 1 to 9.

Comparison between Examples 1A to 3D reveals that the silver compound content in the cold storage material does not affect the crystallization temperature thereof.

INDUSTRIAL APPLICABILITY

The cold storage material according to the present disclosure can be included in cooler boxes suitable for preservation and refrigeration of liquid medicines or food.

The invention claimed is:

1. A cold storage material comprising:
   tetrahydrofuran;
   water; and
   at least one silver compound selected from the group consisting of silver phosphate represented by a chemical formula $Ag_3PO_4$, silver carbonate represented by a chemical formula $Ag_2CO_3$, and a silver oxide represented by a chemical formula $AgO$, wherein
   the cold storage material has a melting point of 2 degrees Celsius or higher and 8 degrees Celsius or lower, and
   the cold storage material has a crystallization temperature of 0 degrees Celsius or higher and lower than the melting point.

2. The cold storage material according to claim 1, wherein the silver compound is the silver phosphate.

3. The cold storage material according to claim 1, wherein the silver compound is the silver carbonate.

4. The cold storage material according to claim 1, wherein the silver compound is the silver oxide.

5. The cold storage material according to claim 1, wherein a molar ratio of the tetrahydrofuran to the water is 0.05 or more and 0.07 or less.

6. The cold storage material according to claim 1, wherein a molar ratio of the silver compound to the water is $2.64 \times 10^{-8}$ or more and $3.70 \times 10^{-4}$ or less.

7. A cooler box comprising the cold storage material according to claim 1.

8. The cooler box according to claim 7, configured to contain a liquid medicine or food.

* * * * *